United States Patent [19]

Numazawa et al.

[11] 4,287,791

[45] Sep. 8, 1981

[54] POWER TRANSMISSION UNIT FOR AUTOMOTIVE VEHICLES

[75] Inventors: Akio Numazawa, Nagoya; Hajime Arai, Aichi, both of Japan

[73] Assignee: Toyota Jidosha Kogyo Kabushiki Kaisha, Toyota, Japan

[21] Appl. No.: 55,783

[22] Filed: Jul. 9, 1979

[30] Foreign Application Priority Data

Jul. 11, 1978 [JP] Japan .................................. 53/84955

[51] Int. Cl.³ ........................ F16H 37/08; F16H 3/08; F16D 3/10
[52] U.S. Cl. ..................................... 74/701; 64/27 B; 74/375; 74/411
[58] Field of Search ................. 74/411, 574, 694, 695, 74/681, 700, 701, 745, 375, 368; 64/1 V, 27 B

[56] References Cited

U.S. PATENT DOCUMENTS

| | | | |
|---|---|---|---|
| 1,965,743 | 7/1934 | Junkers | 64/1 V X |
| 2,437,954 | 3/1948 | Havill | 64/1 V |
| 2,487,934 | 11/1949 | Mastropole | 64/1 V X |
| 2,498,767 | 2/1950 | Phelan | 74/411 X |
| 2,698,526 | 1/1955 | Beier | 74/411 |
| 2,703,847 | 3/1955 | Kalikow | 64/1 V X |
| 2,734,359 | 2/1956 | Mulheim et al. | 64/1 V |
| 2,800,803 | 7/1957 | Bechman et al. | 74/411 |
| 2,861,472 | 11/1958 | Hansz | 74/574 |
| 2,890,772 | 6/1959 | Bixby | 74/700 X |
| 3,007,350 | 11/1961 | Wiseman | 74/411 X |
| 3,078,737 | 2/1963 | McGavern | 74/574 |
| 3,101,010 | 8/1963 | Popovich | 74/700 |
| 3,208,305 | 9/1965 | Butterbaugh et al. | 74/694 |
| 3,318,168 | 5/1967 | DeCove DeCastelet | 74/359 |
| 3,321,988 | 5/1967 | Peras | 74/411 |
| 3,435,694 | 4/1969 | Phinney | 74/411 X |
| 3,499,343 | 3/1970 | Burkhardt et al. | 74/411 |
| 3,575,531 | 4/1971 | Buckingham | 74/411 X |
| 3,667,214 | 6/1972 | Addie | 74/411 X |

FOREIGN PATENT DOCUMENTS

| | | |
|---|---|---|
| 1028761 | 4/1958 | Fed. Rep. of Germany ........ 74/411 |
| 1078720 | 8/1967 | United Kingdom . |
| 1165859 | 10/1969 | United Kingdom . |
| 1178244 | 1/1970 | United Kingdom . |

Primary Examiner—Allan D. Herrmann
Attorney, Agent, or Firm—Stevens, Davis, Miller & Mosher

[57] ABSTRACT

A power transmission unit for automotive vehicles includes a change-speed mechanism, a final drive gearing and a differential gear unit assembled within a casing, the change-speed mechanism having an input shaft drivingly connected to an engine by a friction clutch assembly, and the final drive gearing connected to an output shaft of the change-speed mechanism to drive the differential gear unit. The input shaft is in the form of a torsion bar to reduce torsional rigidity of the drive power train, and a friction member is provided to restrain twisting vibration of the input shaft.

2 Claims, 5 Drawing Figures

POWER TRANSMISSION UNIT FOR AUTOMOTIVE VEHICLES

BACKGROUND OF THE INVENTION

The present invention relates to a power transmission unit for automotive vehicles, and more particularly to an improvement of a power transmission unit of the type which includes a change-speed mechanism arranged for being drivingly connected to an engine by a friction clutch assembly and a final drive gearing connected to an output shaft of the change-speed mechanism to drive a differential gear unit at a selected speed ratio.

In such a conventional power transmission unit as described above, torsional rigidity of the drive power train is relatively high, causing unpleasant noises or extraordinary vibration at respective connections of the drive power train. To reduce the undesired noises and vibration, a certain number of damping springs have been assembled within the friction clutch plate to reduce the torsional rigidity. It has, however, been experienced that the assembled damping springs in the clutch plate increases its inertia moment and enlarges the capacity of the clutch assembly.

SUMMARY OF THE INVENTION

It is, therefore, an object of the present invention to provide an improved power transmission unit of which an input shaft acts as a torsion bar to reduce torsional rigidity of the drive power train to thereby absorb unpleasant shocks given to the transmission unit upon engagement of the friction clutch assembly or in occurrence of fluctuation of the drive torque.

It is another object of the present invention to provide an improved power transmission unit, having the above-mentioned characteristics, in which a friction member is disposed to restrain twisting vibration of the input shaft to reduce vibration or irregularities in the drive.

According to the present invention briefly summarized, there is provided a power transmission unit for an automotive vehicle including a change-speed mechanism arranged for being drivingly connected to an engine by a friction clutch assembly and a final drive gearing connected to an output shaft of the change-speed mechanism to drive a differential gear unit, in which the change-speed mechanism comprises a first input shaft in the form of a torsion bar drivingly connected at its inner end to an output member of the clutch assembly and being elongated toward the outer end thereof in parallel with the output shaft, and a second input shaft in the form of a hollow shaft in surrounding relationship to the first input shaft and being connected at its outer end to the outer end of the first input shaft, the second input shaft having a plurality of drive gear wheels for selectively driving respective change-speed gear wheels on the output shaft.

In the power transmission unit described above, it is preferable that a friction member is resiliently interposed between the first and second input shafts to restrain twisting vibration of the first input shaft relative to the second input shaft.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
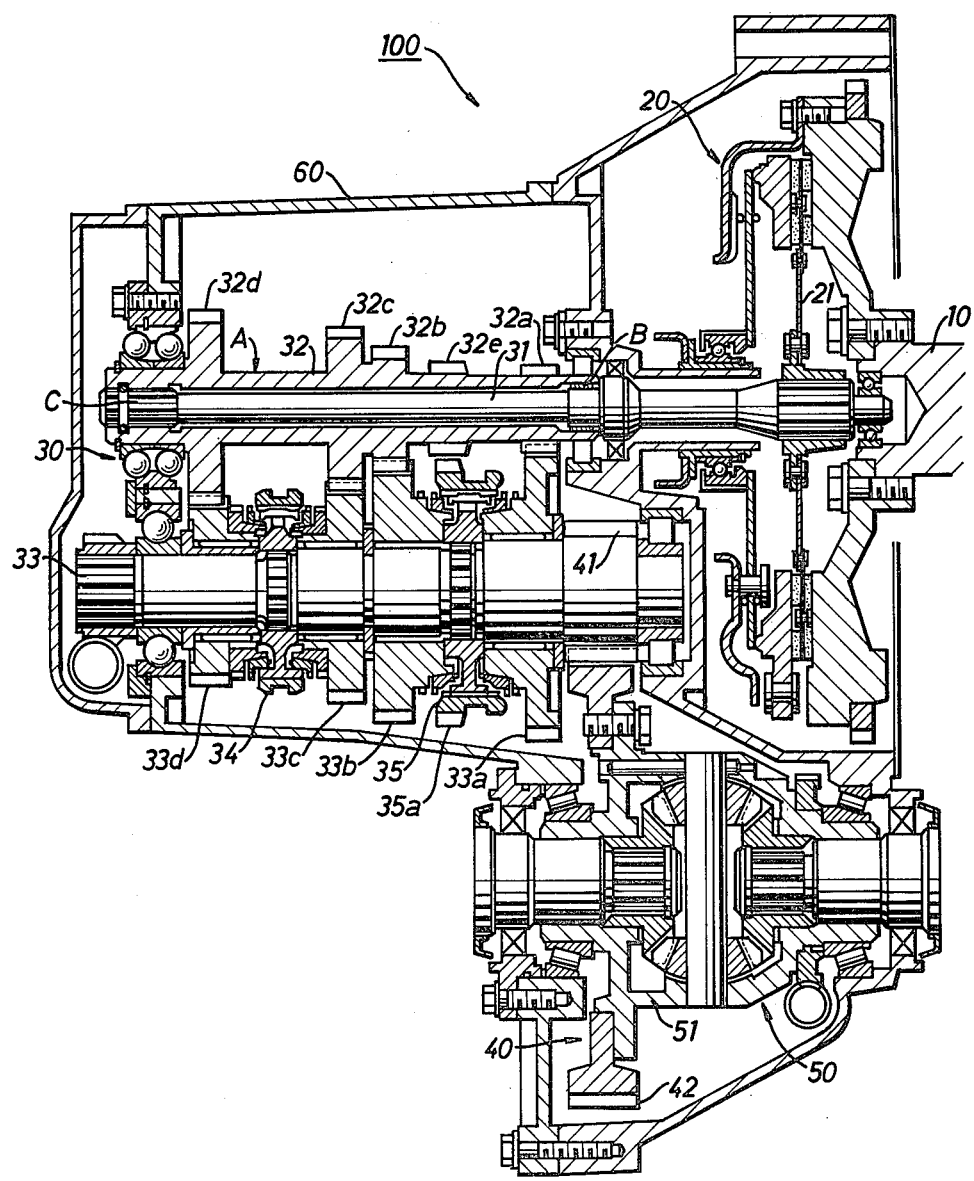
FIG. 1 illustrates a longitudinal section of a power transmission unit for an automotive vehicle in accordance with the present invention.

In FIG. 1 of the drawings, there is illustrated a power transmission unit 100 for use in an automotive vehicle of the front-engine, front-wheel drive type in which an internal combustion engine is arranged in a plane transversely of the longitudinal vehicle axis. The power transmission unit 100 comprises a change-speed mechanism 30, a final drive gearing 40 and a differential gear unit 50 which are unitedly assembled within a transmission casing 60. The change-speed mechanism 30 is to provide four forward ratios and one reverse ratio, and it has an input shaft assembly A which is drivingly connected to a crank-shaft 10 of the engine by a friction clutch assembly 20. The clutch assembly 20 has a single-disc friction clutch plate 21 without conventional pre-stressed damping springs.

The input shaft assembly A includes a first input shaft 31 mounted for free rotation in the crankshaft 10 and a second input shaft 32 in the form of a hollow or tubular shaft in surrounding relationship to the first input shaft 31. The first input shaft 31 carries a splined hub on which the clutch plate 21 is mounted, and the second input shaft 32 is integrally provided thereon with first, second, third and fourth drive gear wheels 32a, 32b, 32c and 32d and with a reverse drive gear wheel 32e. The first input shaft 31 is arranged in the hollow input shaft 32 and is rotatably supported by a bearing metal B in the shaft 32 at its right-hand portion. The first input shaft 31 is also fixed at its left-hand extremity to the second input shaft 32 by means of a spline connection C in such a manner that the input shaft 31 may act as a torsion bar in operation of the transmission unit 100.

The second input shaft 32 is supported at its right-hand extremity from casing 60 by a roller bearing and at its left-hand extremity by ball bearings from casing 60. A countershaft 33 is rotatably supported from casing 60 in parallel with the input shaft assembly A and is integrally provided at its right-hand portion with a small diameter gear wheel 41 of the final drive gearing 40 which is permanently meshed with a large diameter ring gear wheel 42 fixed to a case 51 of differential gear unit 50. Four change-speed gear wheels 33a, 33b, 33c and 33d are freely rotatable on the countershaft 33 and in mesh with the first, second, third and fourth drive gear wheels 32a, 32b, 32c and 32d respectively. A first synchronizer 35 is disposed on the countershaft 33 between gear wheels 33a and 33b so that either one of the two gear wheels 33a and 33b may be selectively and synchronously locked to the countershaft 33 to rotate bodily therewith. The first synchronizer 35 is integrally provided with a reverse gear wheel 35a which is selectively engaged with the reverse drive gear wheel 32e through a reverse idler gear wheel (not shown). A second synchronizer 34 is further disposed on the countershaft 33 between gear wheels 33c and 33d so that either one of the two gear wheels 33c and 33d may be selectively and synchronously locked to the countershaft 33 to rotate bodily therewith.

In operation of the power transmission unit 100, the first input shaft 31 is driven by drive torque from the engine upon engagement of the friction clutch 20 to rotate the second input shaft 32 therewith due to the spline connection C. When a drive power train is completed by shifting operation of either one of the synchronizers, the drive torque is transmitted from the second input shaft 32 to the countershaft 33 and conveyed at a selected speed ratio to the differential gear unit 50 through the final drive gearing 40 to drive the front wheels. During the above operation, the first input shaft 31 acts as a torsion bar to reduce torsional rigidity of the drive power train. This serves to absorb unpleasant shocks given to the transmission unit 100 upon engagement of the friction clutch 20 or in occurrence of fluctuation of the drive torque.

In an application of the present invention, it is desirable that a friction member is resiliently interposed between the two input shafts 31 and 32 to restrain twisting vibration of the first input shaft relative to the second input shaft 32. This contributes to reduce vibration or irregularities caused by torsional action of the first input shaft 31. With the above construction, conventional pre-stressed damping springs may be eliminated from the friction clutch plate 21 to shorten the axial length of the clutch assembly 20. In use of the friction clutch plate without the damping springs, inertia moment of the clutch plate decreases to lighten operation force for shifting the transmission unit 100.

Figure 2:
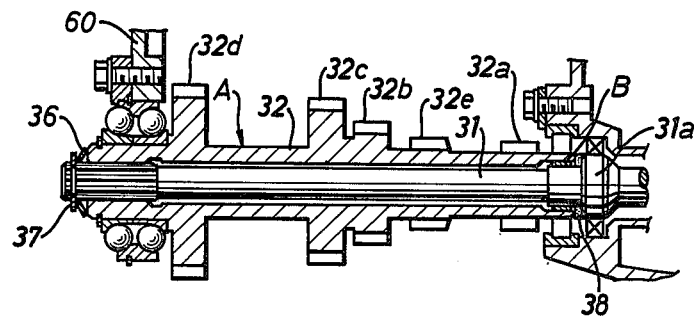
FIG. 2 illustrates a partial longitudinal section of a further power transmission unit which represents a modification to the one shown in FIG. 1.
Figure 3:
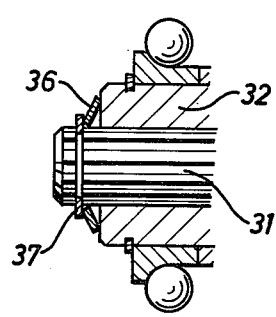
FIG. 3 is an enlarged sectional view of a part of FIG. 2.
Figure 4:
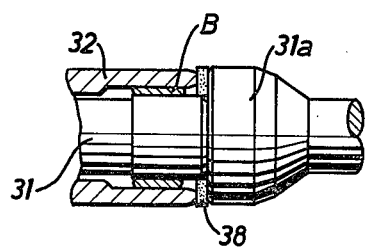
FIG. 4 is an enlarged sectional view of the inventive construction of the modified embodiment shown in FIG. 2.
Figure 5:
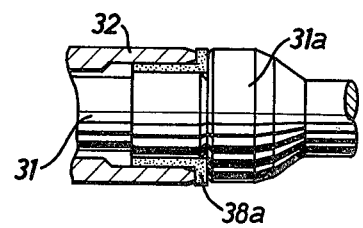
FIG. 5 illustrates a modified form of a friction member adaptable to the inventive construction shown in FIG. 4.

In FIG. 2, there is illustrated a modification of the above-described embodiment in which the first input shaft 31 is axially slidable in relation to the second input shaft 32, and a dish spring 36 is interposed between the left-hand extremities of input shafts 31 and 32 to bias the first input shaft in a leftward direction. As is clearly seen in FIG. 3, the dish spring 36 is engaged at its outer periphery with the left-hand end face of second input shaft 32 and is received at its inner periphery by an annular fastener 37 fixed to the first input shaft 31. In this modification, an annular friction member 38 is secured to an enlarged portion 31a of first input shaft 31 and abuts against the right-hand end face of second input shaft 32 under resilient pressure of the dish spring 36. Thus, the friction member 38 acts to restrain twisting vibration of the first input shaft 31 relative to the second input shaft caused by torsional action of the first input shaft 31. The friction member 38 may be replaced with a sleeve like friction member 38a as shown in FIG. 5. In use of the friction member 38a, the above-noted bearing metal B may be eliminated, and the second input shaft 32 engages at its inner periphery and right-hand end face with the friction member 38a to effectively reduce twisting vibration of the first input shaft 31 relative to the second input shaft 32.

Although certain specific embodiments of the invention have been shown and described, it is obvious that many modifications thereof are possible. The invention, therefore, is not intended to be restricted to the exact showing of the drawings and description thereof, but is considered to includes reasonable and obvious equivalents.

What is claimed is:

1. In a power transmission unit for an automotive vehicle including a change-speed mechanism, a final drive gearing and a differential gear unit housed within a casing, said change-speed mechanism being drivingly connected to an engine by a friction clutch assembly, and said final drive gearing being connected to an output shaft of said change-speed mechanism to drive said differential gear unit, the improvement wherein said change-speed mechanism comprises a first input shaft comprising a torsion bar drivingly connected at the inner end thereof to an output member of said clutch assembly and integrally formed at an intermediate portion thereof with an enlarged portion; a second hollow input shaft in surrounding relationship to said first input shaft and having an inner end facing the enlarged portion of said first input shaft and an outer end axially slidably connected to the outer end of said first input shaft, said second input shaft having a plurality of drive gear wheels for selectively driving respective change-speed gear wheels on said output shaft; resilient means interposed between the outer ends of said first and second input shafts to bias the enlarged portion of said first input shaft toward the inner end of said second input shaft; and an annular friction member secured to the enlarged portion of said first input shaft and maintained in engagement with the inner end face of said second input shaft.

2. The improvement as claimed in claim 1, wherein said friction member is a sleeve like friction member secured to the enlarged portion of said first input shaft and maintained in engagement with the inner end face and inner periphery of said second input shaft.

* * * * *